United States Patent Office 2,768,306
Patented Oct. 23, 1956

2,768,306
SLIT-CONTROL EQUIPMENT

Henry M. Grubb, Highland, and Lorenz J. Schmauch, Whiting, Ind., assignors to Standard Oil Company, Chicago, Ill., a corporation of Indiana Application November 26, 1952, Serial No. 322,656

1 Claim. (Cl. 250—43.5)

This invention relates to devices used to observe the effect of substances upon the distributions of energy of a source of radiation. More particularly, it pertains to the use of spectrometers and to an automatic means for controlling such spectrometers.

Our invention may be applied to infrared absorption spectrometers but it may also be used on other than infrared spectrometers. Most of the spectrometers to which this device is applicable are those used in absorption spectrometry and which employ strip chart recorders, e. g., infrared, X-ray, visible, ultra-violet, etc. However, it might also be useful on Raman spectrometers. As an example of a device of the infrared type, energy from an infrared source is allowed to enter the spectrometer through a window and an entrance slit opening. The radiation after passing through entrance slit is parallelized by a concave mirror, which reflects the parallel light upon a prism. Light passes through the prism and is reflected back through the prism by a Littrow mirror arrangement and onto the concave mirror which focuses the light on exit slit. The wave length of radiation passing through the exit slit is determined by the position of the prism. By suitable instrumentation the radiant power emerging from the exit slit may be measured.

The data obtained may be plotted to form a curve of radiant power vs. wave length. The sample to be inspected is then inserted between the spectrometer and the source of infrared energy whereby portions of the energy of the source will be absorbed by the sample at particular wave lengths characteristic of the sample. By again plotting the resulting radiant power vs. wave length, the modification of the original curve may be observed, thereby giving useful information as to the composition of the substance. Heretofore, the plot of radiant power vs. wave length has been automatically recorded on a moving strip. As the wave length is continuously changed in a selected range, at constant amplification and fixed slit a radiant power curve is obtained.

As the wave length is continuously changed in the 1 to 15 microns range at constant amplification, fixed slit, and no sample, a relative radiant power curve is obtained as illustrated in Figure 1. This curve is primarily a plot of black body radiation from the hot body used as a source of infrared radiation. Because recorder deflection below about 50% with no sample present are undesirable for obtaining spectra of samples, it has been the practice heretofore with such equipment to adjust the slit width manually at intervals to obtain the stepped recorder deflection curve of Figure 2. It is more desirable to change the slit width continuously so as to maintain the deflection at or near 100%. When 100% reference deflection vs. wave length is maintained, samples inserted in the energy beam modify the deflection to give percent transmission spectra and can be compared with values given in the literature. On the other hand, in the case of the stepped recorder deflection curve (Figure 2) it is necessary to make point by point calculations to obtain percent transmission.

It is more desirable to continuously change the slit width so as to maintain the reference deflection at or near 100%. Many methods have been proposed to make the scanning continuous by automatically resetting the slit elements during the operation. This was done to an approximation by means of variable pitched helices or cams but all have not been completely satisfactory for various reasons.

It is, therefore, an object of this invention to continuously maintain the reference deflection at or near 100%. It is a further object of this invention to produce spectra of material as percent transmission. Another object of this invention is to reduce the time required to make a complete radiant power vs. wave length survey when determining the composition of a substance in spectrometry. An additional object of the invention is to reduce the labor required to make radiant power vs. wave length surveys in spectrometry. It is still a further object of the invention to provide means to permit automatic adjustment of the slit members to give 100% reference deflection. Other objects and advantages will become apparent as the description of the invention proceeds.

The invention comprises the use of a function-generating potentiometer in conjunction with other equipment to control a spectrometer in such a way as to maintain a constant or desired reference deflection vs. wave length relation. This is accomplished by a Wheatstone bridge type arrangement in which the potential of a slide wire contact on a linear potentiometer is compared electrically to that of a slide wire contact on a nonlinear (function-generating) potentiometer.

A wave length scanning motor may drive the linear potentiometer and a balancing motor responsive to any difference potential between the two potentiometer slider contacts may drive the non-linear potentiometer which is coupled to the slit shaft, or the reverse arrangement may be used. The balancing motor responds to a small potential difference by the use of a suitable amplifier. The non-linear potentiometer is selected or adjusted so that the wave length and slit shafts move in the proper relationship to maintain a selected reference deflection level, usually 100%. When a sample is then inserted in the energy beam, an absorption is then apparent by a drop in deflection from the set level.

A vacuum infrared monochromator may be used rather than the atmospheric type to eliminate the effects of absorption by the atmosphere (especially water vapor and $CO_2$). However, atmospheric absorption affects only a portion of the percent transmission curve.

Further details of our invention will be described in connection with the accompanying drawings wherein.

Figure 1:
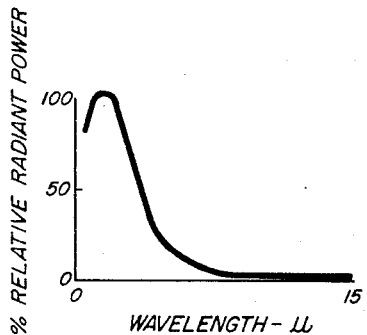
Figure 1 is a relative radiant power curve.
Figure 2:
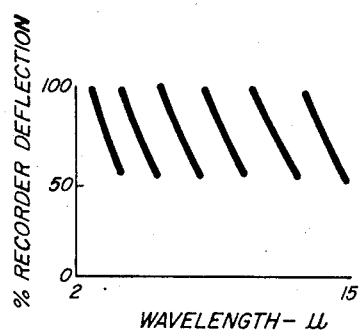
Figure 2 illustrates a stepped recorder deflection curve obtained by manually adjusting the slit width.

Referring to the drawings, we employ a function-generating potentiometer to rectify the energy vs. wave length relation existing on the infrared absorption spectrometer and such a device allows adjustments or changes in coupling as desired, which cannot be readily made with fixed mechanical devices. A combination of electrical components is used for automatically controlling the slit width on absorption spectrometers and the invention will be illustrated by reference to its use on an infrared absorption spectrometer.

Figure 3:
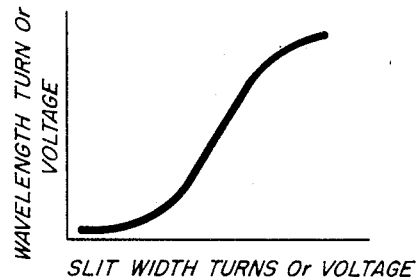
Figure 3 shows the necessary function generated to maintain 100% recorder deflection.

Figure 3 shows the necessary function which must be generated to maintain 100% recorder deflection. It is determined by the spectrometer and can be obtained by plotting at constant amplification the turns of wave length shaft vs. the required turns of the slit shaft to give 100% recorder deflection. By mechanically coupling electrical components to these shafts, the turns may be converted to voltages. This curve may then be generated by selecting one of the electrical components to be a universal function-generating potentiometer. The other component may be a linear potentiometer.

Figure 4:
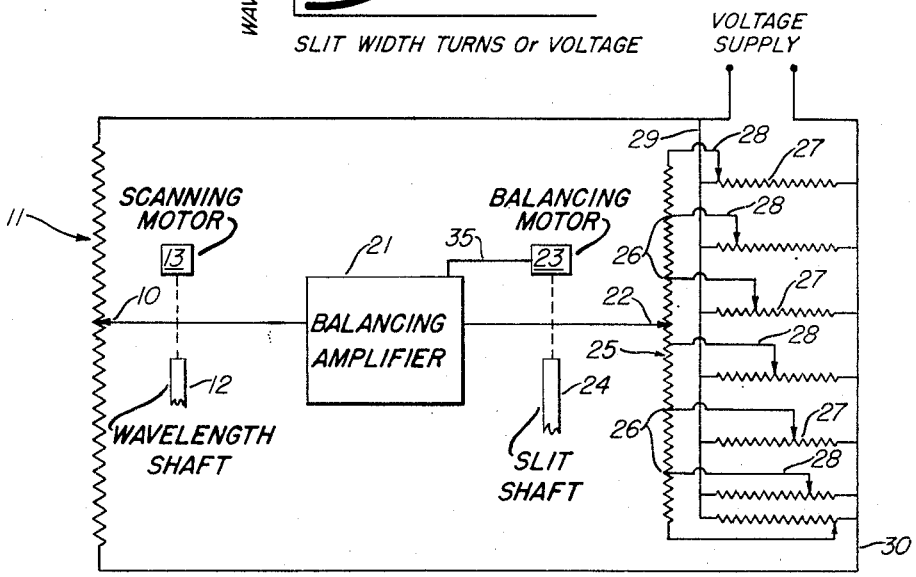
Figure 4 is a block diagram illustrating an electrical circuit in accordance with our invention.
Figure 5:
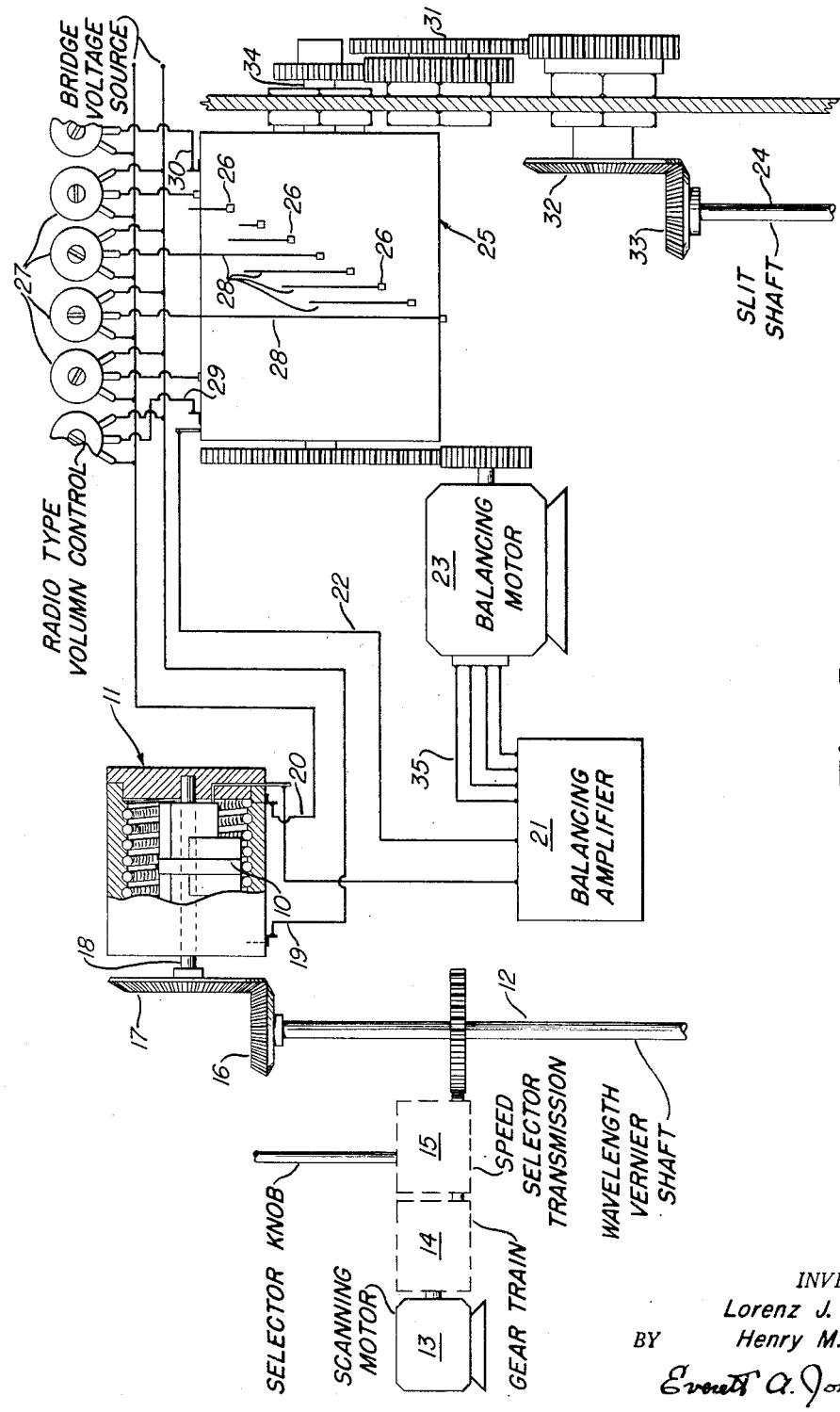
Figure 5 is a schematic showing of the mechanical linkage system integrated with the electrical circuit of Figure 4.

Referring to Figures 4 and 5, we have illustrated the electrical circuits and the mechanical coupling or linkages used in accordance with our invention. The slider 10 of the linear helipot potentiometer 11 is mechanically coupled to the wave length shaft 12, both of which are then driven by the scanning motor 13. In Figure 5 this coupling and drive include a gear train 14, and a speed selector transmission 15 geared to the wave length shaft 12. On the shaft 12 is bevel gear 16 engaging gear 17 on the slider shaft 18 for controlling the position of slider 10 within ten turn helipot 11. This slider 10 picks off a portion of the voltage supplied via leads 19 and 20 to the linear potentiometer 11 and the selected portion is indicative of, or proportional to, the position of the wave length shaft 12.

A balancing amplifier 21 (details not shown) is electrically coupled between the potentiometer sliders 10 and 22. The purpose of balancing amplifier 21 is to detect any unbalance between the two slider voltages and to amplify the unbalance for energizing the balancing motor 23 which in turn drives the slit potentiometer slider 22 to a voltage corresponding to that of the wave length slider potentiometer 11. Thus, as the wave length shaft 12 is rotated, the slit shaft 24 is automatically turned to maintain electrical balance and to adjust the slit width to the predetermined values for giving 100% recorder deflection.

The function-generating or slit potentiometer 25 consists of a tapped potentiometer to which selected voltages are fed at the taps 26 from the adjustable potentiometers 27. These potentiometers may be of the radio-control volume type illustrated in Figure 5 and are adjusted so as to produce a nonlinear voltage across the tapped potentiometer 25 which corresponds to that of the curve in Figure 3.

In the illustrated embodiment, our arrangement includes thirty such radio-type volume controls 27, the sliders 28 of which connect to the taps 26 and the two end terminals 29 and 30 on the fifteen turn helipot 25. A greater or lesser number of taps 26 may be used on the fifteen turn helipot 25, but a sufficient number should be included to "rectify" the energy curve to the desired extent. The more available, the better is the rectification.

The slider 22 of the tapped potentiometer 25 is mechanically coupled to the slit shaft 24 by gears or gears and cams. In the drawing this coupling is illustrated as including a gear train 31 and a pair of bevel gears 32 and 33 at the head of the slit shaft 24. The gearing used between the linear helipot 11, the function-generating helipot 25, and the respective shafts 12 and 24 is proportioned to use effectively the entire range of the windings. However, it is contemplated that when the turns required of the wave length or slit shafts 12 and 24 are the same as the range of turns of the controls used, the mechanical coupling may be direct.

The linear potentiometer 11 and function-generating potentiometer 25 may be interchanged so that the slit shaft 24 is coupled to slider shaft 18 of the ten turn linear helipot 11 and the wave length shaft 12 is coupled to the slider shaft 34 in the function-generating helipot 25.

To use the device, it is first necessary to adjust the potentiometer 27 supplying voltages to the function-generating helipot 25. This is accomplished with the spectrometer source and amplifier turned on and the desired amplifier gain set. A suitable reference such as a rock salt plate or solvent-filled cell is placed in the radiation beam. The slider 22 of the function-generating helipot 25 is then turned to the first tap position where it must remain while the corresponding potentiometer 27 (connected at this point) is adjusted. Adjustment is made to obtain the desired deflection level as shown by a recorder or null system. The remaining potentiometers 27 are adjusted in a similar manner after moving the function-generating helipot slider 22 to the corresponding taps 26. It is necessary to repeat the procedure a number of times until the proper voltages have been obtained as shown by scanning the entire spectral range. When this is accomplished, the recorded energy will follow the desired deflection chart line except in regions where atmospheric absorption do not permit. This is so because sufficient taps 26 may not be available to "rectify-out" the fine structure. However, such absorption may be more easily removed by the other means. For example, a vacuum infrared monochromator may be used rather than the atmospheric type to eliminate the effects of absorption by the atmosphere (especially water vapor and $CO_2$). Setting of the voltages is more easily accomplished when the arrangement of the parts is such that the balancing motor 23 and function-generating helipot 25 are not connected to the same shaft. This is so because the balancing motor 23 will not move the function-generating helipot slider 22 off the tap position being adjusted.

When the device is properly set as described, it is only necessary to substitute the material whose spectrum is wanted for the reference plate or cell in the radiation beam. Scanning then results in an absorption curve. This curve will then be percent transmission of the sample if energies are being recorded, the proper reference having been used initially and no atmospheric absorption having been present. Atmospheric absorption only affects a portion of the percent transmission curve.

Although our invention has been described with reference to one preferred embodiment thereof, it should be understood that this is by way of illustration only and that changes and modifications therein are contemplated by those skilled in the art without departing from the scope of our invention as described herein.

We claim:

An apparatus for controlling the aperture defining means in an infrared spectrometer to maintain the relative energy at about 100% which comprises a function-generating helipot, a first linear potentiometer, a first slider on said function-generating helipot, a plurality of potentiometers connected to uniformly spaced taps on said helipot, a power source applied to said plurality of potentiometers and to said linear potentiometer, a second slider on said linear potentiometer, a scanning motor, a wave length scanning shaft driven by said scanning motor, a first mechanical coupling means linking said wave length scanning shaft and said second slider, a balancing motor, an aperture control shaft driven by said balancing motor, a second mechanical coupling means linking said control shaft and said first slider, and a balancing amplifier means electrically coupled between said first and second sliders on said helipot and potentiometer to amplify any unbalance between said linear potentiometer and said function-generating helipot the output of the amplifier energizing the said balancing motor which in turn drives the said first slider whereby the aperture control shaft is automatically adjusted in response to changes in the wave length scanning shaft position to maintain electrical balance and to adjust the aperture defining means for producing a desired deflection v. wave length relationship.

References Cited in the file of this patent
UNITED STATES PATENTS

| Number | Name | Date |
|---|---|---|
| 2,135,991 | Nessell | Nov. 8, 1938 |
| 2,499,322 | Mather et al. | Feb. 28, 1950 |
| 2,540,797 | Stearns | Feb. 6, 1951 |
| 2,565,734 | Lundahl | Aug. 28, 1951 |
| 2,662,146 | Wilentchik | Dec. 8, 1953 |
| 2,662,149 | Wilentchik | Dec. 8, 1953 |